Figure 1:
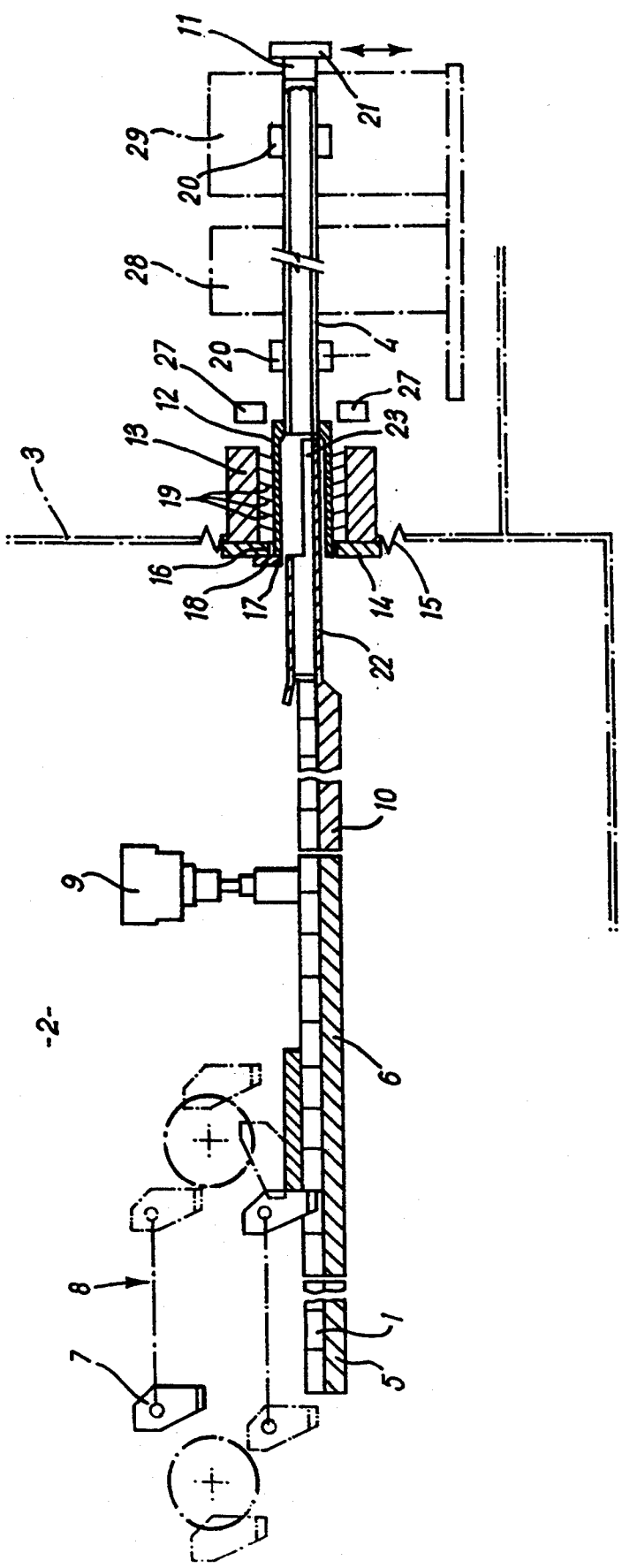

United States Patent [19]

Grimes et al.

[11] Patent Number: 5,425,071
[45] Date of Patent: Jun. 13, 1995

[54] LOADING NUCLEAR FUEL PELLETS INTO CLADDING TUBES

[75] Inventors: John Grimes, Cheshire; Brian Kinley, Derbyshire, both of United Kingdom

[73] Assignee: British Nuclear Fuels plc, Cheshire, United Kingdom

[21] Appl. No.: 207,484

[22] Filed: Mar. 8, 1994

[30] Foreign Application Priority Data

Mar. 8, 1993 [GB] United Kingdom .............. 9304691

[51] Int. Cl.6 ............................................. G21C 21/02
[52] U.S. Cl. .................................... 376/261; 376/451
[58] Field of Search ....................... 376/260, 261, 451; 29/723, 906

[56] References Cited

FOREIGN PATENT DOCUMENTS 2281635 3/1976 France ................................ 376/261

Primary Examiner—Daniel D. Wasil
Attorney, Agent, or Firm—Nixon & Vanderhye

[57] ABSTRACT

An end plug is inserted into the end of a nuclear fuel pin cladding tube after loading mixed oxide fuel pellets into the tube from a containment area. During the pellet loading operation, a disposable sleeve and an end plug carrier protect the external surfaces of the cladding tube and the end plug from contamination. The sleeve, mounted on the end of the cladding tube, is inserted into a seal arranged in a wall of the containment area. The end plug, located within a recess in the plug carrier, is then inserted into the end of the cladding tube by sliding the carrier through the sleeve. Upon removal of the cladding tube, the sleeve and the carrier are retained in the seal for ejection into the containment area during the next pellet loading operation.

9 Claims, 3 Drawing Sheets

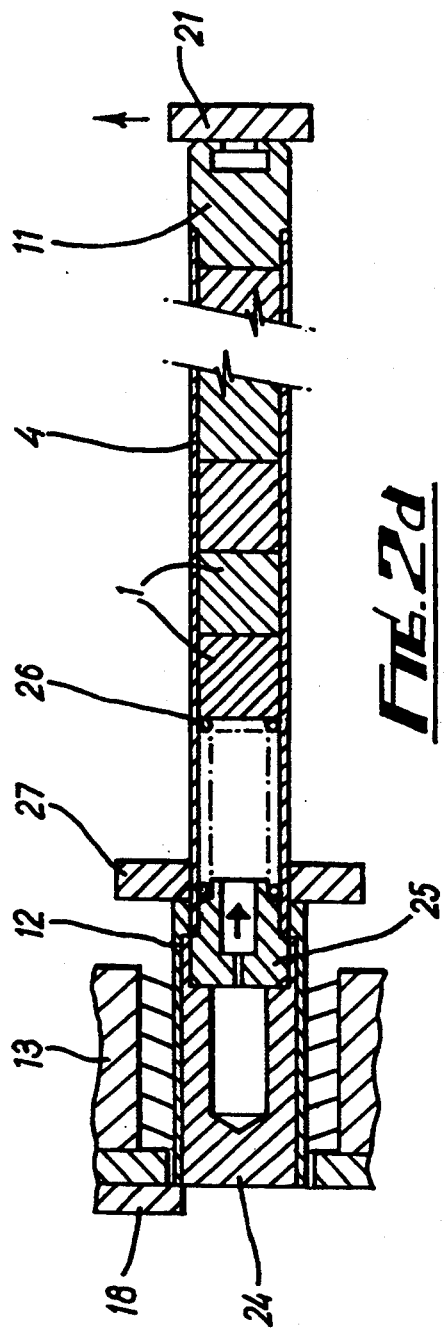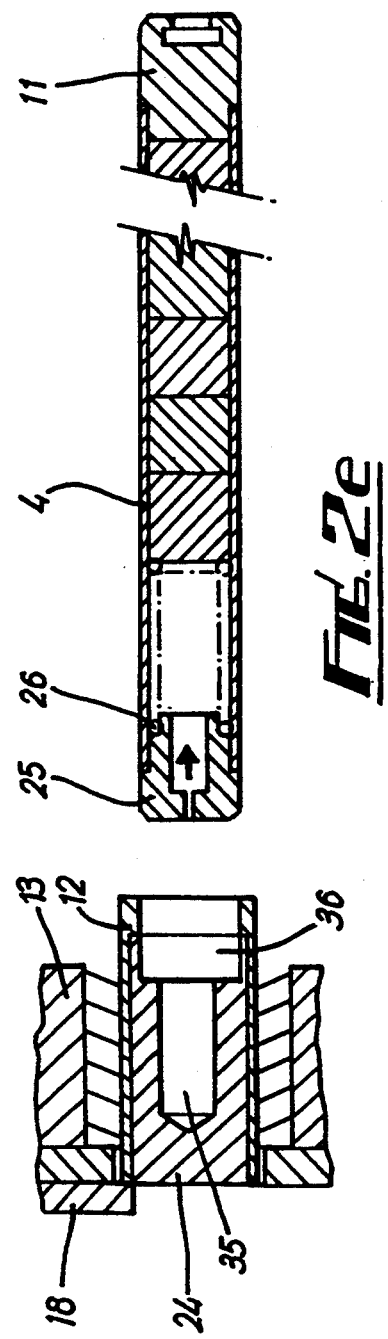

LOADING NUCLEAR FUEL PELLETS INTO CLADDING TUBES

This invention relates to loading nuclear fuel pellets into a cladding tube to form a nuclear fuel pin for use in a nuclear reactor.

In particular, the invention is concerned with inserting an end plug into the cladding tube after loading a stack of fuel pellets into the cladding tube where the pellets are made of a mixed oxide fuel comprising a mixture of uranium dioxide and plutonium dioxide.

Because of the radiological hazards involved in handling fuel pellets containing plutonium they are manufactured in a containment area enclosed by alpha radiation shielding. When loading the pellets from the containment area into a cladding tube located outside the containment area, the end of the tube through which the pellets are inserted protrudes into the containment area. As a result, the end portion of the tube becomes radioactively contaminated. This necesitates subjecting the pin to a decontamination process, which is undesirable since it increases manuacturing costs.

It is an object of this invention to obviate the need for decontamination of the pin following the fuel pellet loading operation.

According to one aspect of the invention there is provided apparatus for inserting an end plug into a fuel pin cladding tube after loading nuclear fuel pellets into said cladding tube, said apparatus comprising a sleeve removably mounted on one end of the cladding tube, said sleeve being slidably locatable in a resilient seal, a carrier having a closed recess for locating therein an end plug for closing said one end of the cladding tube, the carrier being slidable in the sleeve so that on moving the carrier through the sleeve the end plug is inserted into said one end of the cladding tube, the arrangement being such that on withdrawal of the cladding tube with the end plug therein leaves the sleeve and carrier trapped in the seal.

Preferably, the sleeve has an internal seating surface comprising a reduced diameter portion extending from one end of the sleeve, the seating surface being adapted to fit on the end of the cladding tube.

The seating surface preferably extends from the said one end of the sleeve to an internal end surface which is coincident with an end surface of the cladding tube.

The seating surface may be a press fit on the cladding tube.

In a preferred embodiment the end plug has a head portion having an end surface and a peripheral surface, the depth of the recess in the carrier being sufficient to surround the end surface and the peripheral surface.

Preferably, stop means are provided to retain the sleeve and carrier in the resilient seal upon withdrawal of the cladding tube.

The resilient seal may be of the sphincter seal type having a plurality of resilient rings adapted so as to press against the sleeve.

According to a further aspect of the invention there is provided a method of inserting an end plug into a fuel pin cladding tube after loading nuclear fuel pellets into said cladding tube, said method comprising the steps of mounting a sleeve on one end of the cladding tube, inserting the sleeve in a resilient seal, introducing a carrier into said sleeve, said carrier having a closed recess containing therein an end plug which is inserted into said one end of the cladding tube upon introduction of the carrier into the sleeve, and withdrawing said cladding tube with the end plug inserted therein while leaving the sleeve and carrier located in the seal.

Preferably, the method includes the further step of displacing the sleeve and carrier from the seal by a sleeve mounted on a fresh fue pin cladding tube during a subsequent pellet loading sequence.

Embodiments of the present invention will now be described by way of example with reference to the accompanying drawings, in which:

FIG. 1 is a schematic diagram of apparatus for loading fuel pellets into a fuel pin cladding tube, and FIGS. 2a, 2b, 2c, 2d and 2e show successive steps in a pellet loading sequence.

Referring to FIG. 1, cylindrical fuel pellets 1 which are made of a mixed oxide fuel comprising uranium dioxide and plutonium dioxide are formed into rows within a containment area 2 which is bounded by radiation shielding walls 3. The fuel pellets are subsequently loaded into a fuel pin cladding tube 4 located outside the containment area to form a nuclear fuel pin.

Within the containment area 2 the pellets 1 are arranged in end-to-end relationship in a trough provided in a supporting tray 5. The tray 5 has a number of parallel troughs in which several rows of fuel pellets are formed. From the tray 5 a row of pellets 1 is pushed onto a weighing channel 6 by fingers 7 associated with a transfer mechanism 8. A feed stop 9 restrains the leading pellet until a stack containing the required number of pellets is formed. When the stack is of the required length, as determined by weighing equipment associated with the weighing channel, it is forwarded to the vibratory table 10. This may be achieved by vibrating the weighing channel 6.

Outside the containment area 2 a cladding tube 4, fitted with a bottom end plug 11, is positioned in alignment with te pellet stack. Pressed on the end of the cladding tube is a disposable sleeve 12, preferably made of a plastics material, which is slidably located in a resilient sphincter seal 13. The sphincter seal 13 is attached to a mounting plate 14 which is resiliently connected to the containment shielding wall 3 by a diaphragm 15. The sleeve 12 extends through a central opening 16 in the mounting plate with an end surface 17 located against a retractable stop plate 18. The sphincter seal is provided with several rubber rings 19 each of which is divided into sectors. As the sleeve 12 is passed through the centre of the seal the rings 19 are deformed but maintain positive sealing contact by pressing against the sleeve. Clamps 20 are operated to lightly hold the cladding tube 4 in position and an end stop 21 is moved over the bottom end plug 11 to prevent longitudinal movement of the tube.

In operation, the vibratory table 10 and the cladding tube 4 are subjected to vibration by connection to a bi-modal vibrator (not shown). This causes the stack of pellets to migrate along a guide tube 22 integrally formed with the vibratory table 10. The end of the tube 22 is in the form of a semi-circular passage 23 which guides the pelets through the sleeve 12 and introduces them into the cladding tube 4. Advantageously, the guide tube 22 is made of a material which is compatible with the fuel pellets, suitable examples being stainless steel or a zirconium alloy. The pellets migrate along the cladding tube 4 until the leading pellet encounters the bottom end plug 11.

The arrangement described for inserting the fuel pellets into the cladding tube is by way of example only and other systems incorporating, for example, soft handling surfaces or pelelt inserting rams, can also be used.

After retractiing and parking the vibratory table 10 and guide tube 22, a disposable plug carrier 24 (see FIG. 2c) is used to insert a top end plug 25 and plenum spring 26 into the end of the cladding tube 4. Preferably the plug carrier 24 is made of a plastics material. Reaction plates 27 are operated to bring them behind the sleeve 12, the clamps 20 are released and the end stop 21 is removed. The cladding tube 4 is withdrawn while the sleeve 12 and plug carrier 24 are restrained by the reaction plates so that they remain trapped in the sphincter seal 13. The withdrawn cladding tube 4 passes through a girth welder 28 which makes a circumferential weld to join the top end plug 25 to the cladding tube. Further withdrawal of the cladding tube brings the top end plug 25 into a helium filling and welding device 29 which injects helium into the tube through a fine hole 30 (see FIG. 2c) in the plug and then fills the hole with weld material.

The pellet loading sequence will now be described with particular reference to FIGS. 2a, 2b, 2c, 2d and 2e.

Figure 2A:
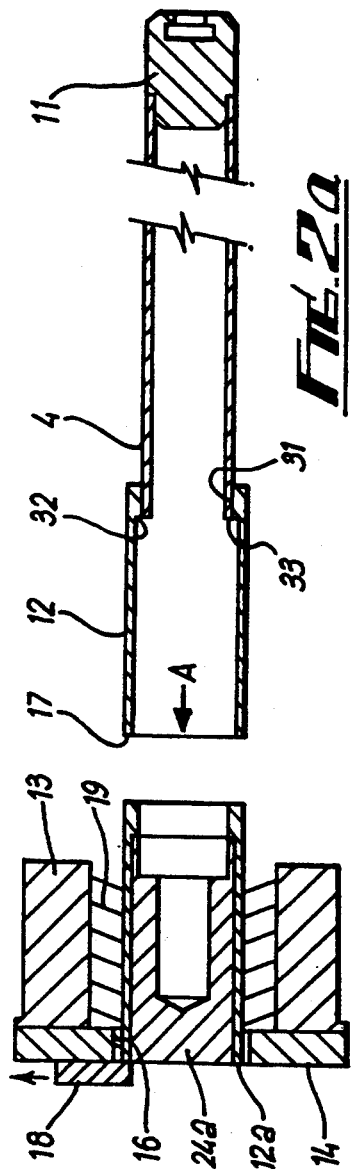

FIG. 2a shows a cladding tube 4 fitted with a bottom end plug 11 at one end and with a disposable sleeve 12 mounted on the other end. At one end the sleeve has a reduced diameter seating 31 which seats as a press fit on the end of the cladding tube 4. An internal end face 32 of the seating 31 coincides with an end surface 33 of the cladding tube. Thus the external end surface of the cladding tube 4 is covered by the seating 31 and is thereby protected from radioactive contamination by the environment in the containment area 2.

Figure 2B:
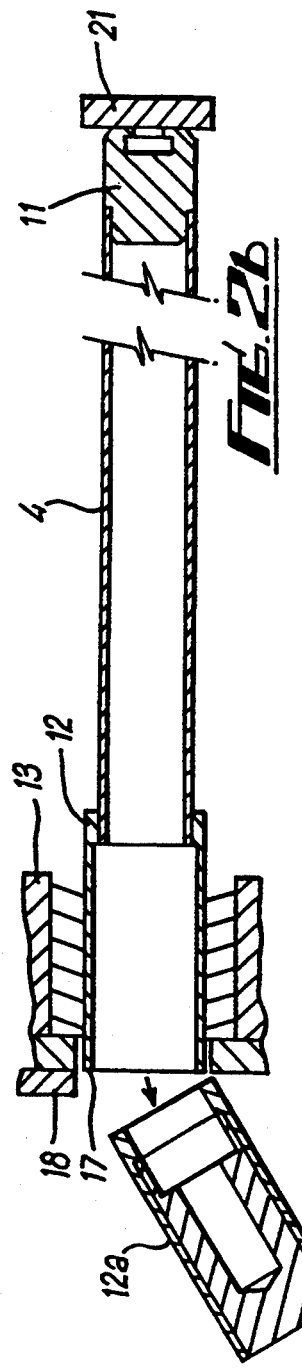

As the cladding tube 4 moves in the direction of arrow A the sleeve 12 engages a sleeve 12a, enclosing a plug carrier 24a, which have been retained in the sphincter seal 13 following the preceding pellet loading procedure. With the stop plate 18 in a retracted position, the new sleeve 12 pushes the sleeve and plug carrier assembly out of the sphincter seal 13 into the containment area 2 (FIG. 2b). Since the new sleeve 12 enters the sphincter seal 13 before the previously used sleeve and plug carrier assembly is removed from the seal, leakage of radioactive substances from the containment area is prevented. The stop plate 18 is then lowered to provide a location for end surface 17 of te sleeve 12.

Figure 2C:
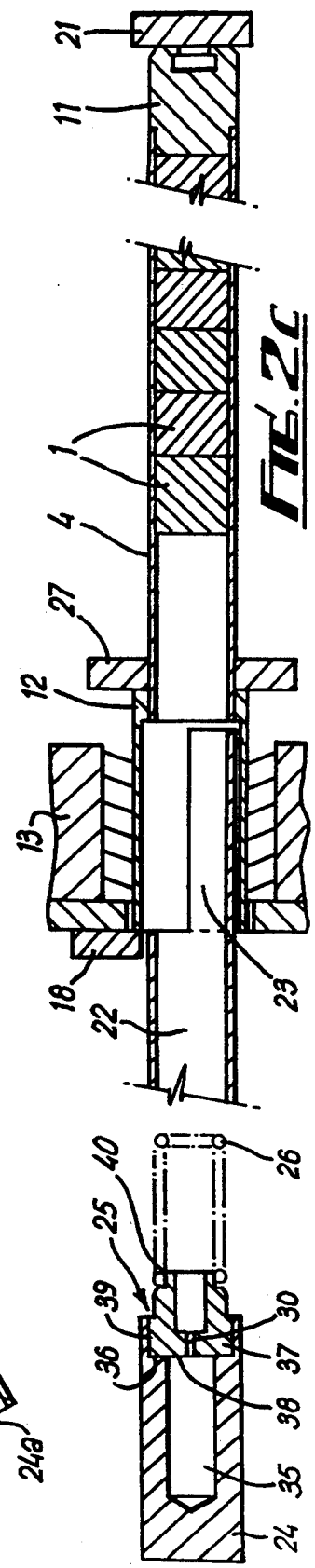

FIG. 2c shows the semi-circular end passage 23 of guide tube 22 extending into the sleeve 12. Upon vibration of the vibratory table 10 ad cladding tube 4, as previously described, the pellets 1 migrate along the semi-circular passage 23 and then down the cladding tube until the leading pellet encounters the bottom end plug 11. When the stack of pellets has been loaded into the cladding tube 4 the table 10 and guide tube 22 are retracted.

The top end plug 25 together with a plenum spring 26 are then pressed into the end of the cladding tube 4 using the disposable plug carrier 24. The plug carrier is of cylindrical shape and ahs an outer diameter such that it is a sliding fit within the sleeve 12. A blind hole 35, drilled along the longitudinal axis of the plug carrier 24, has an increased diameter recess 36 at its forward end. The depth of the recess is sufficient to completely receive a head portion 37 of the top plug 25. It is particularly important to ensure that the end surface 38 and peripheral surface 39 of the head portion 37 are completely covered so as to protect them from possible contamination. At the leading end of the top plug 25 is a shoulder 40 which provides a seating for the plenum spring 26. After retracting and parking the vibratory table 10 and guide tube 22 a remotely controlled manipulator, not shown, provided in the containment area, may be used to push the plug carrier 24 through the sleeve 12 and to press fit the top plug 25 into the end of the cladding tube 4. During installation of the top plug the end stop 21 prevents axial movement of the cladding tube. The plenum spring 26 serves to restrain the fuel pellets during subsequent handling and transportation of the fuel pin so that they do not become damaged.

As seen in FIG. 2d, the reaction plates 27 are moved inwardly to locate behind the sleeve 12 while clamps 20 are released and the end stop 21 is retracted clear of the bottom plug 11. As the fuel pin is withdrawn, the sleeve 12 and plug carrier 24 remain located in the sphincter seal 13 (FIG. 2e). The fuel pin then passes through the girth welder 28 for end plug welding and the helium filling and welding device 29, as previously described, to complete the fuel pin assembly. The sequence of operations is then repeated for the next fuel pin.

It will be seen that during the pellet loading operation none of the external surfaces of the cladding tube or top end plug is exposed to the radioactive environment existing in the containment area. This eliminates the need to subject the fuel pin to a costly decontamination process.

We claim:

1. Apparatus for inserting an end plug into a fuel pin cladding tube after loading nuclear fuel pellets into said cladding tube, the apparatus comprising a sleeve removably mounted on one end of the cladding tube, said sleeve being slidably locatable in a resilient seal, a carrier having a closed reces for locating therein an end plug for closing said one end of the cladding tube, the carrier being slidable in the sleeve so that on moving the carrier through the sleeve the end plug is inserted into the end of the cladding tube, whereby withdrawal of the cladding tube with the end plug therein leaves the sleeve and the carrier trapped in the seal.

2. Apparatus according to claim 1, in which the sleeve has an internal seating surface comprising a reduced diameter portion extending from one end of the sleeve, wherein the seating surface is adapted to fit on the said one end of the cladding tube.

3. Apparatus according to claim 2, in which the seating surface extends from said one end of the sleeve to an internal end surface which is coincident with an end surface of the cladding tube.

4. Apparatus according to claim 2, wherein te seating surface is a press fit on the cladding tube.

5. Apparatus according to claim 1, which the end plug has a head portion having an end surface and a peripheral surface, wherein the said recess has a depth sufficient to surround the end surface and the peripheral surface.

6. Apparatus according to claim 1, wherein stop means are provided to retain the sleeve and the carrier in the resilient seal upon withdrawal of the cladding tube.

7. Apparatus according to claim 1, wherein the resilient seal comprises a sphincter seal of the type having a plurality of resilient rings adapted so as to press against the sleeve.

8. A method of inserting an end plug into a fuel pin cladding tube after loading nuclear fuel pellets into the cladding tube, wherein the said method comprises the steps of mounting a sleeve on one end of the cladding tube, inserting the sleeve in a resilient seal, introducing a carrier into said sleeve said carrier containing therein an end plug which is inserted into said one end of the cladding tube upon introduction of the carrier into the sleeve, and withdrawing said cladding tube with the end plug inserted therein while leaving the sleeve and the carrier located in the seal.

9. A method according to claim 8, comprising the further step of displacing the sleeve and the carrier from the sea by a sleeve mounted on a fresh fuel pin cladding tube during a subsequent pellet loading sequence.

* * * * *